June 13, 1967 R. MNILK ET AL 3,324,551
METHOD AND APPARATUS FOR MAKING BUTTER
Filed Jan. 14, 1966
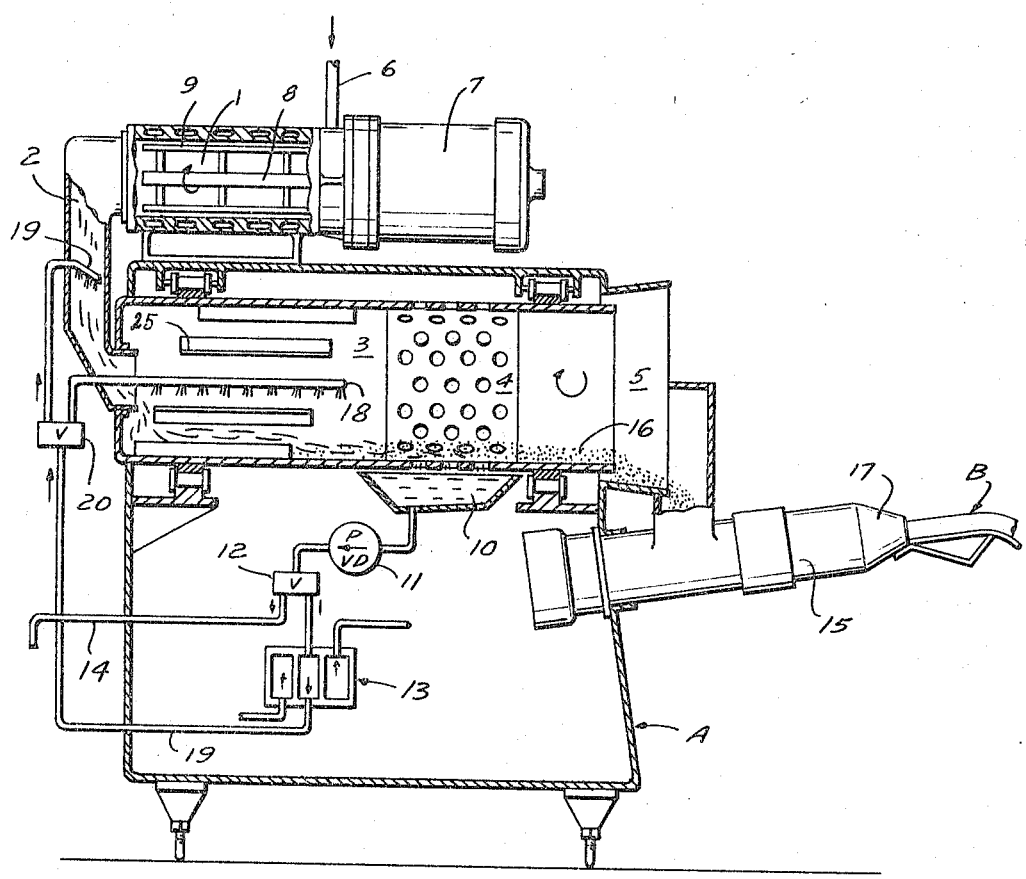
INVENTORS
Reinhold Mnilk
Erich Peters
BY Michael J. Striker
Atty.

3,324,551
METHOD AND APPARATUS FOR MAKING BUTTER
Reinhold Mnilk, Dortmund-Wickede, and Erich Peters, Dortmund-Wambel, Germany, assignors to Holstein & Kappert Maschinenfabrik "Phonix" G.m.b.H., Dortmund, Germany
Filed Jan. 14, 1966, Ser. No. 520,784
Claims priority, application Germany, Jan. 23, 1965, H 54,951
16 Claims. (Cl. 31—89)

The present invention relates to a method and apparatus for making butter.

More particularly, the present invention is concerned with more effective cooling of the butter granules formed by churning cream or other dairy fluid which can be partially converted into butter by churning of the same.

It is known to cool the freshly formed butter granules by passing the butter granules-containing liquid leaving the churning cylinder through a conduit into the separating cylinder in which the residual liquid is separated from the butter granules. The tubular conduit is surrounded by a coaxial outer tube so that an annular space is formed between the two tubes through which a cooling fluid such as ice-cold water is passed. Furthermore, the outer face of the separating cylinder is contacted with ice water. Since, however, the time period during which the butter granules pass through the conduit and through the separating cylinder is very short and, furthermore, the heat transfer through the inner wall of the conduit to the butter granules within the liquid passing through the conduit into the separating cylinder is of relatively low efficiency, this manner of cooling the butter granules is not as effective as desired.

It is therefore an object of the present invention to provide a method and apparatus for cooling the freshly formed butter granules prior to separation of the same from the residual liquid, which will permit effective cooling of the butter granules in a simple and economical manner.

It is yet another object of the present invention to provide a method and apparatus for the effective cooling of the butter granules which can be carried out without increasing the residence time of the butter granules in the butter making apparatus.

Other objects and advantages of the present invention will become apparent from a further reading of the description and of the appended claims.

With the above and other objects in view, the present invention contemplates in a butter making apparatus, in combination, churning means for continuously churning a stream of butterfat-containing liquid so as to form butter granules therein, separating means communicating with the churning means for separating residual fluid from the butter granules-containing stream, cooling means for cooling at least a portion of the thus separated residual fluid, and reintroducing means for introducing at least a portion of the thus cooled residual fluid into the butter granules-containing stream.

The present invention also includes in a method of making butter, the steps of churning a stream of butterfat-containing fluid dairy product so as to form butter granules therein, withdrawing residual fluid from the butter granules-containing stream, cooling at least a portion of the thus withdrawn residual fluid, and reintroducing at least a portion of the thus cooled residual fluid into the butter granules-containing stream upstream of the point of withdrawal of residual fluid from the stream, whereby the butter granules in the stream are cooled by the introduced cooled residual fluid prior to separation of the butter granules from the stream.

Thus, according to the present invention, at least a portion of the buttermilk or residual fluid which is separated from the butter granules is subjected to cooling, preferably by indirect heat exchange, and at least a portion of the thus cooled residual fluid is then sprayed onto the mixture of residual fluid and butter granules, after the mixture has left the initial churning device and before the mixture is separated into residual fluid or buttermilk on the one hand, and butter granules on the other hand.

Preferably, the introduction of the cooled buttermilk, for instance by spraying, is carried out in a conduit leading from first churning stage to a second churning stage and/or in the second churning stage.

This direct cooling by which the butter granules are directly contacted with the cooling liquid, namely the cooled buttermilk, has the great advantage that the area of contact between the coolant and the butter granules which are to be cooled is greatly increased in contrast to the above described prior art method according to which the heat transfer area was limited to the inner face of the conduit or the second churning cylinder, and, furthermore, due to the fact that the relatively ineffective indirect cooling through a separating wall is replaced by direct cooling wherein the cooled buttermilk or the like comes in direct contact with the butter granules which are to be cooled.

Preferably, only a portion of the buttermilk or residual fluid which is separated from the butter granules is subjected to cooling and then reintroduced into the butter making device as described above, while another portion of the buttermilk is withdrawn and further processed in conventional manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the figure is a somewhat schematic elevational view, partially in cross section, of a butter making apparatus in accordance with the present invention.

It will be seen in the drawing that the butter making apparatus A consists essentially of churning cylinder 1, downwardly directed conduit 2, second stage churning cylinder 3, separating cylinder 4 and withdrawal outlet 5. In the illustrated preferred embodiment, second stage churning cylinder 3 and separating cylinder 4 are arranged coaxially and directly adjacent and contacting each other, with the second churning device 3 arranged upstream of separating cylinder 4.[1]

The cream or other dairy liquid which is to be partially converted into butter is introduced through conduit 6 into the churning device 1 which, if two churning devices are serially arranged, will be the first stage churning device. An agitator shaft 8 is provided with agitator blades 8 and is driven by motor 7 so as to rotate at relatively high speed within churning device 1 thereby converting the cream or the like into butter granules and buttermilk. The mixture of butter granules and buttermilk, i.e., the butter granules dispersed in buttermilk pass from churning device 1 through downwardly directed conduit 2 into a second churning device 3 and from there into the coaxial separating cylinder 4. Churning device or cylinder 3 and separating cylinder 4 are jointly rotated at low speed by means of a motor or other driving device (not ---
[1] The second churning device 3 converts rests of the cream, which are not worked up in the first churning cylinder 1, into butter granules and buttermilk. To that end, the second churning device is fitted out with agitator bars 25, which are fixedly mounted to the inner surface of the rotating cylindrical churning device 3.

illustrated). Due to the relatively slow revolution of the second stage churning device 3 and separating cylinder 4, continuous dislocation of the butter granules will take place within the stream of buttermilk or residual liquid having butter granules dispersed therethrough, so that the buttermilk or the like adhering to the granules will be separated with great effectiveness from the butter granules in separating cylinder 4, and the thus separated buttermilk or the like will collect in container 10.

The butter granules which thus have been substantially completely separated from the residual liquid pass then through cylindrical outlet 5 to extruder 15 from which they are extruded at 17 in the form of a continuous strand of butter B ready for being cut into portions and packed.

The buttermilk collecting in container 10 passes through pump 11, preferably a variable drive pump, into distribution valve 12. In distribution valve 12, the stream of buttermilk or the like is separated—if desired—into two portions, of which one portion is withdrawn through conduit 14 and further processed in conventional manner, while the other portion passes through indirect heat exchanger 13 and conduit 19 to distribution valve 20 and from there either to spraying device 19 located in downwardly directed conduit 2 or to spraying device 18 located in the second stage churning device 3. Generally, it will be preferred to operate both spraying devices 18 and 19, however, it is also possible, if desired, to operate only one of these spraying devices.

Furthermore, it is also possible to eliminate second churning device 3, to utilize only spraying device 19, and to directly connect conduit 2 with separating cylinder 4.

The butter making apparatus of the present invention may be so dimensioned as to permit the conversion of cream containing between 25% and 45% fat so as to produce between 400 and 1200 kg. butter per hour. Generally, based on average production, about 2.0 m.³/h. of withdrawn buttermilk will be recycled through the indirect cooling device and the sprayers into the stream of buttermilk having butter granules suspended therein and emanating from the churning device or the first stage of the churning device in the event that two churning stages are provided.

The cream which is introduced through conduit 6 generally will have a temperature between about 6 and 12° C. and in the second churning stage 3 will have a temperature of about 10° C. However, the buttermilk which is passed through distributor valve 12 into indirect cooler 13 will be cooled therein to a temperature of about 5° C. and will then be reintroduced into the mixture of buttermilk and butter granules through spray conduits 18 and/or 19 and it will be achieved thereby that the butter granules 16 will be introduced into extruder 15 at a temperature of about 6° C.

As it is well known to those skilled in the art, the quality of the butter is improved by lowering the temperature of the butter granules during the processing of the same. Thus, the present invention will result in a considerable improvement in the quality of the thus produced butter due to the more effective cooling of the butter granules.

It will be understood that each of the elements described above, or two or more together, may also find a useful application in other types of butter making apparatus differing from the types described above.

While the invention has been illustrated and described as embodied in a butter making apparatus including two churning stages, it is not intended to be limited to the details shown, since various modifications and structural changes may be made without departing in any way from the spirit of the invention.

Without further analysis, the foregoing will so fully reveal the gist of the present invention that others can by applying current knowledge readily adapt it for various applications without omitting features that fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a butter making apparatus, in combination, at least one churning means for continuously churning a stream of butterfat-containing liquid so as to form butter granules therein; separating means communicating with said churning means for separating at least a portion of the residual fluid from said butter granules-containing stream; cooling means for cooling at least a portion of the thus separated residual fluid; and reintroducing means for introducing at a point upstream of said separating means and downstream of at least one churning means at least a portion of the thus cooled residual fluid into said butter granules-containing stream, whereby the butter granules are cooled prior to separation of residual fluid therefrom.

2. A butter making apparatus as defined in claim 1, wherein said churning means comprises two serially arranged stages, and wherein said reintroducing means admits cooled residual fluid into the material passing between the two stages.

3. A butter making apparatus as defined in claim 2, and including a conduit interposed between and communicating with said two stages, and wherein said reintroducing means admits cooled residual fluid into said conduit.

4. A butter making apparatus as defined in claim 1, wherein said churning means comprises two serially arranged stages, and wherein said reintroducing means admits cooled residual fluid into the second one of said stages.

5. A butter making apparatus as defined in claim 1, wherein said churning means comprises two serially arranged stages, and wherein the second of said two stages is coaxial with and located directly upstream of said separating means.

6. A butter making apparatus as defined in claim 5, wherein said second stage of said churning means and said separating means include cylindrical, coaxial housings integral with each other, and a cylindrical housing of said separating means is formed with perforations for the passage of residual fluid therethrough.

7. A butter making apparatus as defined in claim 6, and including rotating means for rotating said second stage of said churning means and said separating means about their common axis.

8. A butter making apparatus as defined in claim 1, and including withdrawal means for withdrawing butter granules from said separating means.

9. A butter making apparatus as defined in claim 8, and including extrusion means operatively connected to said withdrawal means for receiving said butter granules and forming thereof an extruded body of butter.

10. In a method of making butter, the steps of churning in at least one stage a stream of butterfat-containing fluid dairy product so as to form butter granules therein; withdrawing at least a portion of the residual fluid from the thus formed butter granules-containing stream; cooling at least a portion of the thus withdrawn residual fluid; and reintroducing at least a portion of the thus cooled residual fluid into said butter granules-containing stream upstream of the point of withdrawal of residual fluid form said stream and downstream of at least one churning stage, whereby said butter granules in said stream are cooled by said introduced cooled residual fluid prior to separating of said butter granules from said stream.

11. A method of making butter as defined in claim 10, wherein said churning, withdrawing, cooling and reintroducing are carried out in a continuous manner.

12. A method of making butter as defined in claim 10, and including a step of extruding the butter granules remaining after withdrawal of residual fluid from said butter granules-containing stream so as to form thereof an extruded body of butter.

13. A method of making butter as defined in claim 10, wherein the step of churning of a stream of butterfat-containing fluid dairy product so as to form butter granules therein is carried out in two stages, and the cooled residual fluid is reintroduced into said butter granules-containing stream downstream of the first churning stage and upstream of said withdrawing residual fluid from said butter granules-containing stream.

14. A method of making butter as defined in claim 13, wherein said cooled residual fluid is reintroduced into said butter granules-containing stream downstream of the first churning stage and upstream of the second churning stage.

15. A method of making butter as defined in claim 13, wherein said cooled residual fluid is reintroduced into said butter granules-containing stream within second churning stage.

16. A method of making butter as defined in claim 10, wherein a portion only of the withdrawn residual fluid is cooled, and the entire thus cooled portion of residual fluid is reintroduced into said butter granules-containing stream.

References Cited
UNITED STATES PATENTS

| | | | |
|---|---|---|---|
| 1,650,625 | 11/1927 | Hapgood | 31—40 |
| 2,649,377 | 8/1953 | Wilsmann | 99—119 |
| 3,109,740 | 11/1963 | Robichaux | 99—119 |

SAMUEL KOREN, *Primary Examiner.*

HUGH R. CHAMBLEE, *Examiner.*